United States Patent Office 3,089,196
Patented May 14, 1963

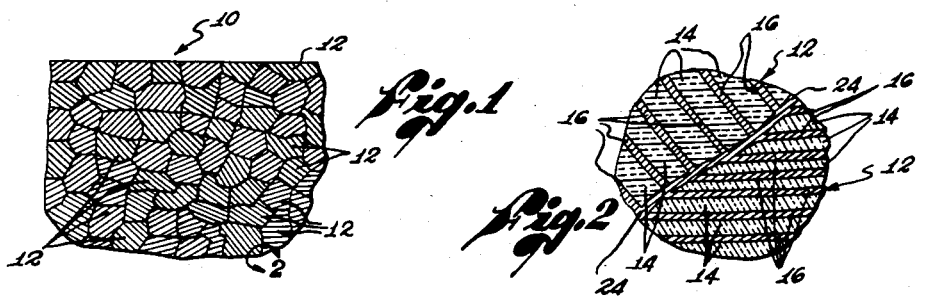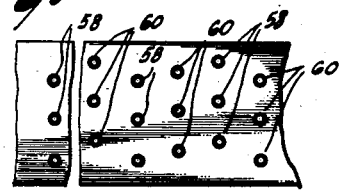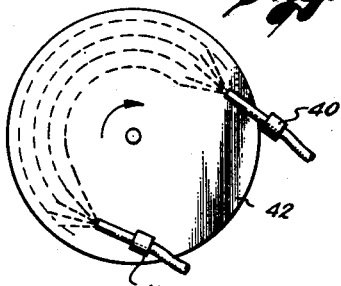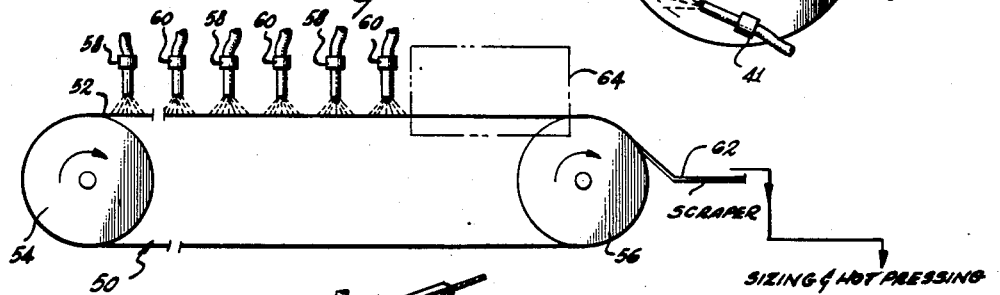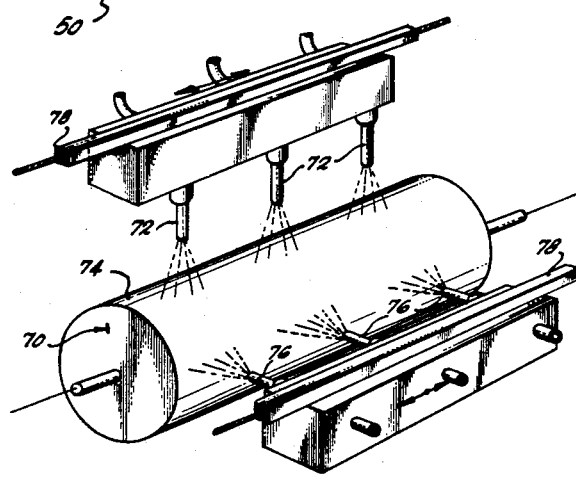

3,089,196
PROCESS FOR MAKING LAMINATED MATERIAL
William J. Knapp and Francis R. Shanley, Los Angeles, Calif., assignors to The Rand Corporation, Santa Monica, Calif., a non-profit corporation of California
Filed Aug. 10, 1959, Ser. No. 832,695
20 Claims. (Cl. 18—47.5)

This invention relates generally to the production of ductile, composite materials, and relates more specifically to improvements in processes for making materials, which are ordinarily brittle at room temperature or at elevated temperature, more ductile. These ductile composite materials are used structurally in flight structures, such as airframes, jet engines, rocket engines and missiles, as well as in nuclear-powered devices, and as a structural material for general purposes.

The terms "ductility" and "brittleness" may be defined, for purposes of this patent application, as follows: when deformation of the crystal structure of a material is caused, as by tensile stress, and the amount of permanent deformation without fracture in the crystal structure is appreciable, the material is said to be ductile; when the permanent deformation taking place in the crystal structure, prior to fracture, is limited, the material is said to be brittle. Thus the amount of permanent (plastic) deformation of a material, without fracture, is generally a measure of ductility of the material.

The ductility of a material is greatly affected by its crystal structure. It is well established that ductility results, to a great extent, from "slip" of individual crystals on many closely spaced planes, these planes generally representing planes of the closest packing of atoms. There is also increasing realization of the extremely important role that may be played by surface conditions in the ductility behavior of both ductile and brittle materials.

At the present time there is not, to our knowledge, any material which retains its high strength at elevated temperatures, in the neighborhood of 3000° F. or higher, while possessing ductile characteristics, both at low temperatures, e.g. 50° F., and also at such high temperatures.

Ceramic materials have been studied for some years now, for use as a primary structural material because of their excellent high temperature properties, and because some ceramics are actually stronger than metals in compression. However, they have very little ductility at room temperature, that is to say, they are classified as brittle materials. At elevated temperatures, e.g. 2000° F., the brittleness in ceramic materials is somewhat reduced. However, to make practical structural use of such materials, their brittleness must be reduced very substantially, especially in the lower temperature regions.

Various metals such as beryllium, tungsten, etc. and their alloys have very advantageous strength properties at elevated temperatures (as opposed to common metal alloys such as stainless steel, aluminum, magnesium, titanium, etc. which becomes too soft, or even melt, at temperatures encountered in gas turbines, high speed aircraft, and missiles). However, beryllium, tungsten, and other high strength refractories are, at present, not practically usable in such high temperature environments because of their brittleness at nominal temperatures.

Glass is yet another ceramic material which is normally brittle, but which becomes ductile at elevated temperatures. However, glass is actually classified as an undercooled liquid (at room temperature) and undergoes continuous softening as the temperature is increased. At high temperatures, glass is unsuitable because of its flow characteristics.

Prior attempts to overcome the brittleness of these above-mentioned materials have not met with too much success. For example, ceramic materials have been mixed with a less brittle metal to produce so-called "cermets." The lack of success of the cermets appears to be due to the fact that the metallic component has not been utilized in the best possible manner. Thus, if a ceramic body has many approximately spheroidal unconnected pieces of metal imbedded in it, any plastic deformation of the metal particles inherently requires a similar plastic deformation in the surrounding ceramic material, which is not possble at nominal temperatures. Thus, the composite material behaves in a brittle manner. This will be true for any brittle material containing small unconnected ductile particles.

Conversely, if a composite material is made up largely from a ductile material (such as metal), in which small spheroidal particles of brittle material (such as ceramic) are imbedded, the composite material will not exhibit the desirable high temperature properties of the brittle (ceramic) material, i.e., it will have too much plastic deformation at high temperatures.

Attempts to improve the ductility of the high-melting-point metals, such as tungsten or beryllium, have not been successful on a large scale. Various metallurgical treatments, heat treatments, hot or cold working, have not produced the ductility required for general structural use.

Bearing in mind these facts, a co-pending patent application SN 825,978 has been filed on July 9, 1959, entitled "Composite Material and Method of Making Same," Francis R. Shanley, a co-inventor of the present application, is the inventor of the co-pending application above identified. This application is directed primarily to a novel composite material in whch one of the materials is brittle while another of the materials is relatively ductile, the brittle material being geometrically aligned relative to the ductile material so as to permit plastic deformation of the composite material to take place in any direction.

Certain advantageous phenomena are encountered in the behavior of very thin layers of materials. As in the case of very fine wires ("whiskers"), the properties of materials are strongly affected by extreme thinness of laminates. Another object, therefore, of the invention described in the above-identified patent application is to provide a composite material having a plurality of very thin laminates of alternating materials which will exhibit improved properties as compared with the corresponding bulk material. For example, it may be possible to attain a higher melting point for the ductile component by using very thin laminates.

The composite body comprises at least two dissimilar materials, one material being brittle, and having high strength at elevated temperatures, such as ceramics or high-strength refractory metals, while the other material (or materials) is relatively ductile, such as a ductile metal or alloy, the different materials of the composite being so aligned as to enable plastic slip to occur at room temperature, as well as at elevated temperature, under the application of shearing stresses, and to enable advantage to be taken of the favorable effects resulting from the use of very thin laminates.

In general, the invention of the co-pending application comprises a mode of improving ductility of a first material by arranging a less brittle material, in a special microgeometric manner with relation to the first material.

As mentioned, in a brittle material, such as a ceramic, the amount of plastic slip of individual crystals along the many closely spaced planes within the material under application of shearing stresses (caused by a tensile or compressive stress) is negligible at room temperature. It has been discovered, however, that by utilization of a multiplicity of closely spaced thin planes of a more ductile material set within thin planes of a less ductile material, a composite unit having a "built-in" slip mechanism is produced. If, then, a composite material is formed from a multiplicity of these composite units which are randomly oriented, and small relative to the composite material (e.g. one-millionth the volume), it is found that the resulting material is ductile under all directions of loading.

Bearing in mind the foregoing facts, it is a major object of the present invention to provide an improved process wherein the composite material of the above-identified co-pending application can be made.

A further object of the present invention is to provide a process for making randomly oriented laminated composite material wherein said laminations are formed in a continuous fashion by either hot-forming or cold-forming techniques.

Another object of the present invention is to provide a process for making randomly oriented laminated composite material wherein the individual layers of laminated material are extremely thin, and said laminations are formed in continuous fashion.

These and other objects of the invention will become clearly understood by referring to the following description, and to the accompanying drawings, in which:

FIGURE 1 is a greatly enlarged cross-section of one embodiment of the composite material produced by our process;

FIGURE 2 is a further enlargement of a portion of the composite material shown by the curved arrow 2—2 in FIGURE 1;

FIGURES 3 and 4 are schematic representations of, in side elevation, various types of apparatus for making the composite material of our invention;

FIGURE 5 is a fragmentary plan view of FIGURE 4; and

FIGURE 6 is a schematic representation, in perspective, of another embodiment of our process.

Referring especially to FIGURES 1 and 2, the internal structure of one embodiment of the composite material 10, described in detail in the co-pending above-identified application, is here shown. The units or pseudo-crystals 12 of the composite material are shown in greatly enlarged form for purposes of illustration. The pseudo-crystals 12, however, may be on the order of thousandths or hundredths of an inch in thickness, length, and/or width.

Each pseudo-crystal 12 of the composite material is composed of a series of laminated thin, flat, parallel planes of alternating brittle and ductile material, 14 and 16 respectively.

The brittle material 14 is a ceramic material, while the ductile material 16 is one of the ductile metals. For purposes of this application, a ceramic material may be defined as one comprised of non-metallic, inorganic compounds and elements, whose preparation involves a high temperature heat treatment. The ceramic materials thus include carbides, cemented carbides, nitrides, borides, silicides, oxides, and silicates. Certain ceramic materials can exist in either the crystalline or amorphous states; for example, some silicates, borates, aluminates and others can be formed into either crystalline or glass (amorphous) form. Typical ceramic materials are alumina ($Al_2O_3$), beryllia (BeO), magnesia (MgO), building brick, forsterite ($MgSiO_4$), mullite porcelain, steatite porcelain, zircon porcelain, sewer pipe (vitrified clay), and various glass products. Graphite (carbon) is also included, for purposes of this application, as a ceramic.

The ceramic material 14 utilized in the embodiment shown in FIGURE 1 is alumina, while the more ductile metal, employed as the ductile material 16, is stainless steel. Many other ductile materials may be employed so long as they are chemically inert with respect to the brittle component. Among additional satisfactory metals are ductile iron, brass, silver, copper, chromium, and various alloys of these metals.

Among other classes of ductile materials usable in the preparation of the pseudo-crystal 12 are any one of the numerous plastic compounds, e.g. those of the polyvinyl, phenolic, urea-formaldehyde, polystyrene, methyl methacrylate, nylon, cellulose derivative, and epoxy type. Also, organic materials such as wood, paper, etc. can be employed as the ductile component. However, for high-temperature applications, the use of ductile metals to provide the slip mechanism is preferred.

The relative proportions of the materials in the pseudo-crystals is a matter dictated by the use to be made of the composite material 10. For example, for high-temperature applications, the majority of the material would probably be the ceramic material. For low-temperature applications, the ceramic material may be present in amounts less than 50%. In studying and analyzing the behavior of the pseudo-crystals 12, it is believed that the ceramic planes of material slide or slip over each other under the application of shearing stresses, by means of the slipping qualities provided by the thin metallic planes of material 16. Further, very thin layers of ceramic, if they are permitted to slide over each other, are found to be bendable without fracturing. Thus, the pseudo-crystals 12 can adjust their individual shapes to provide for continuity of inelastic deformation.

Additional advantages are believed to arise from the geometry of the pseudo-crystal 12 because of the fact that very thin ribbons or sheets of material have strength properties greatly superior to those for bodies of normal size. For example, in the case of fine wires of micron thicknesses, ultimate tensile stresses of the order of $10^6$ pounds per square inch have been attained. In the case of fine glass fibers, values of over one-half million p.s.i. have been obtained. These values compare with "normal" ultimate tensile strengths of $10^5$ p.s.i. for metals and much less for glass or other ceramics.

In the pseudo-crystals 12, strength increases over the normal are applicable for probably the same reason. While the use of laminations in composite materials is not in itself novel (e.g. safety glass), the use of much thinner laminations than have been utilized heretofore does give rise to superior strength properties for the composite material. In particular, brittle materials will generally exhibit much higher tensile strength and elongation when fabricated in very thin sheets. Therefore, the combination of relatively ductile and brittle materials in the form of very thin laminations provides sufficient strength and elongation for certain types of structures.

It is preferable that, in order to attain these increased strength characteristics, the laminations be less than 0.001 inch in average thickness. It will, of course, be understood that the laminations may be of greater thickness, if increased strength characteristics, due to extreme thinness, are not desired, while still retaining, for the composite material, a greater overall ductility.

The above-described laminated material is broken up into small particles 12 ("pseudo-crystals") and these particles are used as a base material from which structural parts are fabricated, by a sintering, or other bonding process.

The primary reason for using the laminated material in the form of small "pseudo-crystals" is to provide approximately equal ductility in all directions. Ductility is provided by slip under shearing stresses. A single "pseudo-crystal" will deform by slip only when loaded by shearing stresses in the planes of the ductile layers. An analogy can be made to the deformation of a pack of playing cards. However, if the "pseudo-crystals" are allowed to take on random orientations in the manufactured part, there will be slip under any type of loading which produces internal shearing stresses.

The action of the pseudo-crystals resembles that of the real crystals of a ductile material, except that a real crystal usually contains several sets of slip planes oriented in different directions.

Thus, our process is directed to the formation of a composite material 10, made from the pseudo-crystals 12, randomly oriented as shown in FIGURE 1, and the resulting composite material 10 has approximately equal ductility in all directions.

The juncture or boundary 24 of two adjacent pseudo-crystals 12 is shown in FIGURE 2, in greatly enlarged fashion. This juncture or boundary 24 between the pseudo-crystals is composed of the ductile metal component, and it is to be noted that all the adjoining metallic planes 16 are bonded thereto. The overall ductility of the composite material is believed to be greatly enhanced by such a geometric configuration, in particular because it provides for relative slip or rotation between pseudo-crystals.

Theoretically, the pseudo-crystals should each be provided with several different sets of slip planes, but this is not found to be actually necessary if the pseudo-crystal is capable of a slight amount of plastic rotation with respect to its neighbors. This is provided by the "grain-boundary" 24 of duticle material which forms during the sintering or bonding process and which provides the bond between pseudo-crystals. If necessary, additional ductile material (for example, in the form of powder), can be employed during the sintering or bonding process in order to ensure ductile "grain-boundaries," or the pseudo-crystals can be coated with a suitable material before sintering.

A similar random arrangement of pseudo-crystals exists in a metal-metal composite material, as exists for the above-described ceramic-metal composite. The same advantages of random orientation of the pseudo-crystals and of the ductile boundary layers are present in this metal-metal composite, as in the composite material 10. That is to say, the ductile behavior of the brittle metal component appears to be enhanced by creating conditions at the surfaces of the brittle metal layers that favor slip rather than fracture, and secondly, the metal-metal composite material is provided with a mechanism for plastic deformation through slip within the ductile metal layer.

Other ductile metal components may be used, such as aluminum, iron, brass, or magnesium, for combination with beryllium or other brittle metal components, the geometric configuration of these composites being very similar to that shown in FIGURE 1.

Many other combinations of materials may also be selected having the geometric configurations shown and decsribed with reference to FIGURES 1 and 2. Among these composite materials are the combination of high-strength brittle metals and plastic, and the combination of organic material (such as wood) with a metal. Thus, a wood-metal laminate could be made, cut into small pseudo-crystals, and then bonded together with a suitable binder to form a composite material for some low-temperature applications.

The novel composite material described in my co-pending application requires, for its production, first the formation, as by deposition, of many thin alternating layers of brittle and ductile material, until a laminated body of desired thickness is built up. The laminated body, at this point, has increased ductility, with respect to the brittle material, in some directions but not in all directions. The laminated body is therefore crushed or comminuted into extremely small particles (but without any appreciable elimination of the laminations). These very small particles, units, or pseudo-crystals are then bonded or sintered in random fashion, as with an ordinary powdered material, perhaps at elevated temperature, and at high pressure, in the desired structural shape.

The resulting material is a composite material composed of small pseudo-crystal units in each of which there are many closely spaced thin parallel planes of metal, these units being arranged in more or less random orientation.

The first step in our process for making any of the afore-described composite materials is, thus, the formation of many thin (preferably, 1.001 inch or less) flat alternating layers of brittle and ductile material. Our process, in general, involves the hot or cold spraying or deposition of the alternating materials in this molten, semi-molten, or powdered form onto a moving carrier surface. The thus built-up laminated material is then comminuted, and the comminuted material is bonded, as by sintering (under pressure in some cases), in randomly oriented fashion.

Referring especially to FIGURE 3, a schematic representation of one embodiment of an apparatus for accomplishing our process is shown. A spray gun 40 "hot sprays" a layer of a molten ductile material (e.g. copper) onto a rotating highly heat-resistant carrier surface 42, over a particular area thereof. The carrier surface can be made of materials such as special alloy steels, or special ceramic compositions. An instant later, a simultaneously operation second spray gun 41 "hot sprays" molten brittle material (e.g. alumina or beryllium) over the same area previously sprayed by gun 40.

Guns are presently available for flame-spraying both metals and ceramics. For example, plasma jets (such as made by G. M. Giannini & Co., Inc. of Pasadena) are available which can spray metals and ceramics at 15,000° to 30,000° Kelvin. The rotation of the disc may be clockwise or counterclockwise. A clockwise direction is shown. In this manner, a series of alternating layers can readily be built up of desired relative thickness, as well as desired overall thickness.

Referring now especially to FIGURES 4 and 5, another apparatus utilized in making laminated material is shown in schematic form.

An endless moving belt 50 made of a highly heat-resistant material such as a ceramic fibre material, acts as the carrier surface 52, and is moved continuously from left to right by power-driven wheels 54 and 56. Flame-spray guns 58 and 60 are disposed above the continuously moving belt and a plurality of guns are positioned so as to form rows transverse of the direction of movement of the belt 50, the number of guns forming a row depending upon the width of laminate desired. The guns in each row are offset with respect to the guns in adjacent rows for purpose of achieving greater uniformity of deposit.

The molten brittle material is first sprayed onto the carrier surface 52 by means of the guns 58 (or a series of guns in this first row), thereby forming a layer or film of predetermined thickness. The carrier surface 52 then moves to the next "station" where molten ductile material is sprayed over the just-deposited brittle layer by means of the gun 60 (or a series of guns 60 at this second "station"). The alternate deposition, and resulting build-up of laminations, proceed as the carrier surface 52 continues its movement to the right. The guns 58 and 60 can be readily adjusted to produce an overall thickness of a desired amount.

The resulting laminated product is removed from the carrier surface 52 by means of a scraper 62, made of a wear-and-heat-resistant material, such as a carbide, and is then comminuted, sized, and hot-pressed (i.e. sintered) in a mold of desired configuration.

As mentioned, the spray guns 58 and 60 are offset with respect to adjacent rows for the purpose of producing layers of greater uniformity. Greater uniformity may sometimes be obtained by reciprocating each row of guns in the approximate direction of the transverse axis of each row.

The method just described for producing a laminate material employs the spraying of molten materials. It is also found desirable to prepare the laminate material by the cold spraying of ductile and brittle materials dispersed in a suitable liquid phase. For example, the spraying of ceramic and metal powders, each dispersed in a separate water phase, is found suitable for the deposition of very thin layers of these materials, in a relatively inexpensive fashion.

The apparatus employed is of the arrangement shown in FIGURES 4 and 5 except that guns 58 and 60 are cold-spray guns for the various dispersions instead of spray guns for molten materials. The deposited laminate is then dried by being passed through a heating zone, such as an infrared oven, shown in dotted line, and designated by the numeral 64.

The laminate after being thus dried is scraped off and comminuted into granules of a desired size. The granules are then sintered or otherwise bonded in a mold of desired configuration.

The laminate, composed of very thin layers of alternating materials, is sometimes also desirably formed on a rotating cylindrical drum 70, a row of guns 72 being directed onto the carrier surface 74, the guns 72 spraying molten material on surface 74. An offset row of guns 76, spraying dissimilar molten material, is located so as to spray the molten material onto the rotating carrier surface 74. The guns are preferably slidably mounted on tracks 78 so as to be reciprocated. The rate of reciprocation of each set of guns is identical so that the initial offset of each set of guns 72 is maintained.

The alternating layers of the laminate can also be built up by electrodepositing the alternate layers of brittle and ductile materials onto a rotating drum or disc. This method has special advantages when extremely thin layers are to be produced. The simultaneous electrolytic deposition of two or more different materials has been employed to produce alloys, but to our knowledge such a method has not been employed in an alternate manner so as to obtain a laminated material.

The process of vapor deposition may also be used in obtaining alternate layers of material. In this case, the apparatus of FIGURES 4 or 6 would be suitably modified to include vapor-deposition apparatus and apparatus for the application of electrostatic charges.

After deposition of a desired thickness of lamination, the laminate is removed from the drum and processed, as will now be described.

The laminate formed by any of the foregoing processes is unidirectional, i.e. planar. Such a unidirectional laminate does not have similar ductility in all directions but is useful in certain applications where uniaxial stresses are primarily encountered.

In most instances, the randomly oriented pseudo-crystals of laminated structure are preferred so that equal ductility in all directions will be more nearly obtained.

To this end, the laminate, formed by any of the foregoing processes, is then comminuted or broken up into small particles, the size of which may be roughly of the order of 100 times or less the average thickness of a layer in the laminations. The comminution process should not cause delamination to any appreciable extent. A suitable mechanical method employs a crushing operation in a jaw crusher or rolls crusher. Another method utilizes a punch or projector on a rapidly revolving wheel, to which the composite material is fed.

The final steps involve assembling the small particles or pseudo-crystals in a random orientation, in an appropriate mold of desired configuration, and bonding them together. If metal is employed as one component of the composite material, a sintering process (involving heat and pressure) presently appears most suitable, although additional bonding agents may be employed. If a plastic is employed as one component layer, the final bonding process most suitably involves a bonding by means of a thermosetting liquid plastic such as an epoxy resin.

The resulting composite material is composed of small integrally bound pseudo-crystals, in each of which there are many closely spaced thin alternating parallel planes of ductile material and brittle material, these crystals being arranged in generally random orientation, as previously described. Such random orientation in the composite material gives rise to an equal ductility in all directions, this property being especially suitable for use in devices subjected to biaxial tension, such as pressure vessels.

A compression stress-strain diagram for an alumina-stainless steel composite material, produced in accordance with the hot spray method of our invention, showed that the composite material underwent very substantial elongations, and withstood very substantial compressive loading prior to fracture. In short, the alumina composite material behaved in a "ductile" manner. The aluminum oxide content, by volume, was approximately 72%, and by weight, was 53%.

It may be desirable (in the initial step of forming certain metal-metal laminates, or metal-ceramic laminates) to bond these laminates together without going up to temperatures at which extensive diffusion of a metal component may occur. It may therefore sometimes be advantageous to introduce minor amounts of a third component, to enhance the bonding of the laminates, minimize diffusion, and also to possibly affect the surface properties of each of the layers of material in the laminate. This third component can also be added in the final step of the process, that is, can be introduced into the mass of pseudo-crystals, and enhance the crystal bonding, and surface and boundary effects, while minimizing diffusion tendencies. For example, the pseudo-crystals might be coated with a deposit of powder, or electroplated, or otherwise modified so as to obtain certain desirable boundary layers in the final product.

It is to be understood that the final product obtained from any of the foregoing processes may be subjected to further metallurgical treatment in the same manner as that commonly used in improving the properties of metals and alloys. This includes annealing, precipitation heat-treatment, etc.

While several embodiments of our process for making composite material have been shown and described, it will be understood that changes and modifications may be made that lie within the skill of workers in the art, and lie within the scope of our invention. Hence, we intend to be limited, in the scope of our invention, only by the claims, which follow.

We clam:

1. A process for making a laminated material, which comprises: depositing a thin layer of brittle material from a source onto a carrier surface, the carrier surface and said source of brittle material moving relative to each other during the deposition; depositing a layer of more ductile material from a source upon said layer of brittle material, the carrier surface and said source of more ductile material moving relative to each other during the deposition, said deposition of brittle and more ductile layers comprising one cycle; repeating said cycle a multiplicity of times to thereby build up a multiplicity of alternating layers of brittle and more ductile material, removing said multi-layered material from said carrier surface; comminuting said multi-layered material to form a multiplicity of small grains of multi-layered structure; and bonding said comminuted material in random orientation.

2. The process of claim 1 wherein a multiplicity of thin layers of said brittle and more ductile material are deposited simultaneously at different points relative to said carrier surface.

3. The process of claim 1 wherein said brittle and more ductile materials are simultaneously sprayed onto said carrier surface in a molten state.

4. The process of claim 1 wherein said brittle and more ductile materials are dispersed in liquid, and said liquid dispersions are deposited simultaneously but at different points relative to said carrier surface.

5. The process of claim 1 wherein said brittle and more ductile materials are deposited electrolytically onto said carrier surface.

6. The process of claim 1 wherein said brittle and more ductile materials are deposited from a vapor state onto said carrier surface.

7. A process for making a composite material which comprises: spraying a thin layer of brittle ceramic material from at least one spray source onto a carrier surface, the carrier surface and spray source being in motion with respect to each other; simultaneously spraying a thin layer of more ductile metal material from at least one spray source, onto said deposited layer of brittle material, said more ductile material and said carrier surface being in motion with respect to each other, said spraying of the brittle and the more ductile layers of material constituting one cycle; repeating said cycle a multiplicity of times to build up a multi-layered material composed of alternately generally parallel layers of brittle and more ductile material; removing said multi-layered material from said carrier surface; comminuting said multi-layered material to form a multiplicity of small grains of multi-layered structure; and bonding said comminuted material in random orientation.

8. The process of claim 1 wherein said bonding of comminuted material takes place under application of heat and pressure.

9. The process of claim 1 wherein the thickness of at least one of the layers is less than 0.001 inch.

10. The process of claim 1 wherein the brittle and more ductile materials are deposited by being sprayed in molten form.

11. The process of claim 1 wherein an intermediate bonding material is deposited between each of said brittle and more ductile layers of material.

12. A process for making a laminated material which comprises: depositing a thin layer of brittle material on a moving carrier surface, from a plurality of spaced sources; simultaneously depositing a thin layer of more ductile material onto said layer of brittle material, from a plurality of spaced sources, offset from said sources of brittle material; reciprocating said plurality of sources of brittle material and said sources of ductile material at the same rate, so as to maintain said offset relationship; continuing said alternate deposition of brittle and more ductile materials until a predetermined thickness of laminate is built up; comminuting said laminate to form a multiplicity of small grains; and bonding said multiplicity of comminuted grains in random orientation.

13. The process of claim 1 wherein additional ductile material is added to said comminuted material prior to the bonding of said comminuted material so as to provide improved ductile boundaries between said small grains of multi-layered structure.

14. The process of claim 1 wherein said small grains are coated with a ductile material, after comminution, and are then bonded in random orientation.

15. The process of claim 1 wherein the brittle material is a ceramic material.

16. The process of claim 1 wherein the brittle material is beryllium.

17. The process of claim 1 wherein the brittle material is tungsten.

18. The proces of claim 1 wherein the more ductile material is a metallic material.

19. The process of claim 1 wherein the more ductile material is a plastic.

20. The process of claim 1 wherein the more ductile material is a solid organic material.

References Cited in the file of this patent

UNITED STATES PATENTS

| | | |
|---|---|---|
| 2,003,778 | Willis | June 4, 1935 |
| 2,083,201 | Poppe | June 8, 1937 |
| 2,216,728 | Benner et al. | Oct. 8, 1940 |
| 2,246,502 | Bramsen et al. | June 24, 1941 |
| 2,843,646 | Conant | July 15, 1958 |
| 2,903,375 | Peras | Sept. 8, 1959 |

OTHER REFERENCES

Ceramic Age, "Metal-Ceramic Material," April 1959, page 46. (Copy in Cement Dig.)